United States Patent [19]
Morris

[11] 3,988,643
[45] Oct. 26, 1976

[54] LATCH CIRCUIT
[75] Inventor: David Morris, Brooklyn, N.Y.
[73] Assignee: Litton Business Systems, Inc., Morris Plains, N.J.
[22] Filed: Oct. 25, 1974
[21] Appl. No.: 518,103

[52] U.S. Cl. ........................... 317/33 VR; 317/33 R; 323/17; 323/22 T
[51] Int. Cl.² ...................... H02H 7/20; H02H 3/08
[58] Field of Search ............ 317/33 VR, 31, 33 SC; 323/22 T, 17, 9, DIG. 1; 307/297, 288, 272, 289; 321/2

[56] References Cited
UNITED STATES PATENTS

| | | | |
|---|---|---|---|
| 3,078,410 | 2/1963 | Thomas | 317/33 VR X |
| 3,432,726 | 3/1969 | Meyer et al. | 17/33 VR X |
| 3,489,922 | 1/1970 | Lee | 307/288 X |
| 3,548,220 | 12/1970 | Rogers | 307/288 X |
| 3,582,713 | 6/1971 | Till | 317/33 VR X |
| 3,714,512 | 1/1973 | Grabowski | 317/33 VR |
| 3,753,078 | 8/1973 | Hedel | 323/22 T X |
| 3,754,182 | 8/1973 | Morris et al. | 323/22 T X |

*Primary Examiner*—J D Miller
*Assistant Examiner*—Patrick R. Salce
*Attorney, Agent, or Firm*—Stephen A. Roen; Norman Friedman; Robert F. Rotella

[57] ABSTRACT

A Schmidt trigger voltage regulator having a latching circuit at its input to disable the regulator during an overload condition and automatically resets the latching circuit when the overload condition is removed thereby allowing the regulator to function in its normal voltage regulating mode.

4 Claims, 1 Drawing Figure

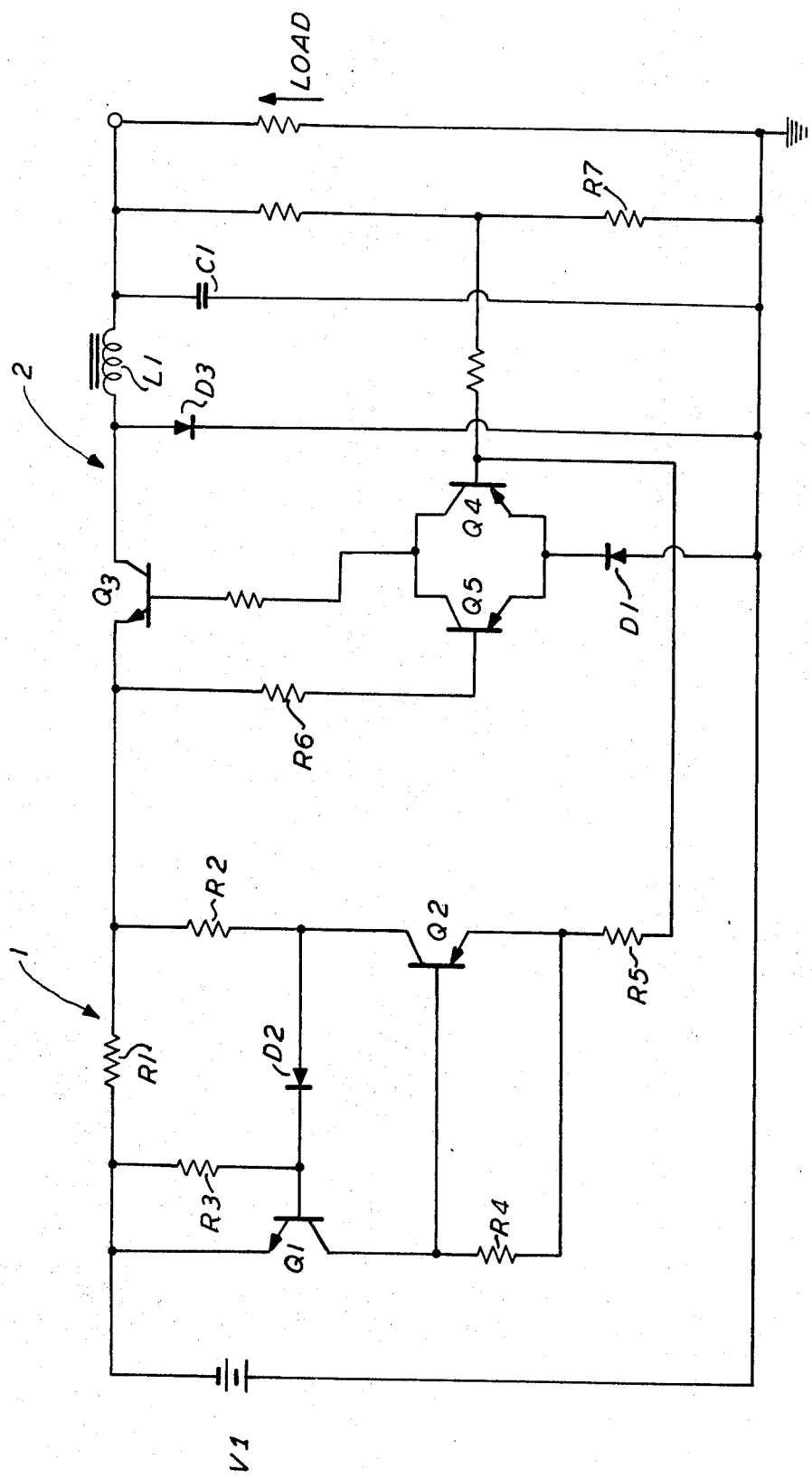

LATCH CIRCUIT

BACKGROUND OF THE INVENTION

Short circuit protection devices used with voltage regulators of the switching type have been developed but these have various shortcomings which affect their usefulness. These devices usually employ a fusing arrangement at the input of the switching voltage regulator. Such fusing arrangements sometimes do not properly function in the situation where there is a momentary short thereby resulting in the switching transistor being shorted and placing the input voltage directly across the load when the short circuit disappears. This may result in the load being damaged or destroyed. Furthermore such fusing arrangements, even when properly operating, would normally require a resetting operation, such as replacng a fuse and/or throwing a switch.

SUMMARY OF THE INVENTION

It is, therefore, an object of this invention to provide an improved short circuit protection circuit for a switching voltage regulator circuit.

Another object of this invention is to provide an improved short circuit protection circuit for a switching voltage regulator circuit having good short circuit protection characteristics.

A further object of this invention is to provide an improved short circuit protection circuit for a switching voltage regulator circuit which protects against momentary short circuits of the load.

A still further object of this invention is to provide an improved short circuit protection circuit for a switching voltage regulator circuit which is automatically reset upon elimination of the short circuit condition.

These and other objects of the present invention are accomplished in the illustrative embodiment by providing a latching circuit at the input of a Schmitt trigger voltage regulator circuit which is fed by a battery supply voltage. The latch circuit basically comprises two transistors which connected in a regenerative fashion, with associated biasing resistors and diode, whose states are controlled by the particular voltage developed across one of the biasing resistors connected in series with a series switching transistor of the Schmitt trigger voltage regulator. This series switching transistor is in turn controlled by a Schmitt trigger circuit having a first and second triggering stage, which in the normal mode of operation, is controlled by an output voltage detector. The output voltage detector is coupled to and provides a control signal to the first triggering stage. An end of the latching circuit is coupled to said first triggering stage, which during an overload condition will disable said first triggering stage causing the series switching transistor to open up thereby protecting it and the output load.

BRIEF DESCRIPTION OF THE DRAWING

The invention is illustrated in the drawing of which the sole FIGURE is a schematic diagram of a circuit incorporating the features of this invention.

One end of an input voltage source V1 is coupled to a latch circuit 1 and more particularly to an emitter of a NPN transistor Q1 and at its other end to diode D1 of the Schmitt trigger voltage regulator circuit 2. Transistor Q1 is connected through a diode D2 to the collector of a PNP transistor Q2, and its base is directly connected to transistor Q1's collector. A series connected biasing resistor R1 is connected to the emitter of transistor Q1 at one end and to the emitter of an NPN series switching transistor Q3 of a conventional Schmitt trigger voltage regulator 2 and through a second biasing resistor R2 to the collector of transistor Q2 and to one end of diode D2. Another biasing resistor R3 is connected across the base emitter junction of transistor Q1 and a bias resistor R4 is connected across the base emitter junction of transistor Q2. A coupling resistor R5 connects the output of latch circuit 1 to the base of a first PNP triggering transistor Q4 of the Schmitt trigger voltage regulator 2.

In operation, under normal load condition, the latch circuit 1 will be open, allowing the Schmitt trigger voltage regulator 2 to function normally and regulate the output voltage. In such normal mode of operation the Schmitt trigger regulator 2 will function as follows; when the input voltage V1 is applied thereto, a second PNP triggering transistor Q5 conducts as a result of the base drive through a bias resistor R6; this transistor Q5 then turns ON the series NPN transistor Q3, the latter allowing current to pass from the input voltage source V1 through an inductive flyback coil L1 to an output load. As the second triggering transistor conducts, it drives a first triggering transistor Q4 OFF. This action between these two triggering transistors is complementary in this circuit; they are alternately ON and OFF, and at any given time they are always in opposite states of conduction. The current passing through transistor Q3 also charges up a flyback storage capacitor C1. When the output voltage increases so that the voltage across a sensing resistor R7 of the output voltage detector is greater than the sum of the diode voltage of D1 and the base emitter junction voltage of transistor Q4, this first triggering transistor Q4 will conduct thereby bypassing the base drive circuit of the second triggering transistor Q5 to drive transistor Q5 OFF. This will result in series transistor Q3 being turned OFF. As a result of this, flyback inductor L1 will then supply current through a free wheeling diode D3 to the load and flyback storage capacitor C1. When the inductive energy of L1 decreases below a certain point capacitor C1 will then take over and start to discharge through the load. The output voltage however, will continue to decrease, and as it decreases the base drive through first triggering transistor Q4 will also decrease eventually turning it OFF; such action will turn second triggering transistor Q5 ON thereby turning series transistor Q3 back ON and allowing it to again conduct, hence the cycle will repeat. In this conventional circuit the state of the triggering transistors are always opposite to each other and during the time interval that the series transistor Q3 is either ON or OFF capacitor C1 both charges and discharges and peaks in the middle of every half-cycle.

During such normal mode of operation the latch circuit 1 will be open as the magnitude of the current following through series resistor R1 will be insufficient to provide the required forward bias for transistor Q1 which will remain in a nonconductive state as will its associated transistor Q2. If however, the load becomes short circuited or the output current rises above a predetermined value, the overload condition will be reached. This condition will result in the latch circuit 1 being automatically "Set," switching both transistors Q1 and Q2 into conduction, and thereby biasing the first triggering stage Q4 of the Schmitt trigger regulator 2 ON. This will result in the series transistor Q3 being switched into non-conduction since the second triggering transistor Q5 will be turned OFF when the first triggering transistor Q4 is turned ON thereby depriving transistor Q3 of its proper biasing voltage. With a proper choice of the circuit parameters of the components of the latch circuit 1, the latch will automatically reset itself when the overload condition is removed thereby allowing the Schmitt trigger regulator 2 to function in its normal operating mode to provide output voltage regulation.

In order to more fully understand the operation of the invention and in particular the operation of the latch circuit 1, if it is assumed, for purposes of simplicity of explanation only, that resistor R1 has a magnitude of one ohm, and that when the current through resistor R1 reaches a threshold value of about two amperes, the latch circuit 1 becomes "Set" or is turned "ON." This state is explained thus; the voltage across series resistor R1 then equals approximately two volts resulting in current flowing through diode D2 and the base emitter circuit of transistor Q1. If resistors R2 and R3 are properly chosen so that sufficient current flows through diode D2 and the base emitter diode of transistor Q1, both diodes will be forwarded biased, each with about 0.7 volts across it, with 0.6 volts across resistor R2. Under such voltage conditions, transistor Q1 will be forward biased into conduction resulting in collector current through resistor R4 which will result in transistor Q2 being turned ON. A regenerative effect will result since transistor Q2 will pass collector current through resistor R2 resulting in transistor Q1 being driven further into conduction and the voltage across resistor R2 reversing polarity. This regenerative action will occur very quickly thereby immediately turning series transistor Q3 OFF to protect the load.

Ordinarily, if the overload circuit condition is removed the latch circuit 1 will remain Set as sufficient bias will be provided by V1. A switch (not shown) in the input line from V1 would have to be manually opened to disconnect the input voltage V1 from the latch 1 to reset the latch circuit. This would of course deprive the latch circuit 1 of its required bias voltage and both transistors Q1 and Q2 would return to their OFF condition and transistor Q4 would no longer be disabled. This can be automatically achieved and without the use of said manually operated switch by the proper choice of circuit parameter and characteristics of the components of the latch circuit 1 and in the present embodiment the circuit elements shown in the following table result in such resettable feature;

R3=24K ohms

R1=1.67 ohms

R2=1K ohms

R4=1K ohms

R5=10K ohms

Q1=MPSL01

Q2=MPSL51

D2=IN4446

Obviously many modifications and variations of the present invention are possible in light of the above teachings. It is therefore to be understood that within the scope of the appended claims the invention may be practiced otherwise than as specifically described.

What is claimed is:

1. An electrical power supply comprising:
    a switching voltage regulator circuit including a Schmitt trigger circuit means; and
    latch means, coupled to said Schmitt trigger circuit means, for turning the switching voltage regulator off when the load current exceeds a predetermined value and which automatically resets itself when the load current goes below said predetermined value, including a pair of opposite conductivity transistors, each having a base, emitter, and collector, and a diode coupled from the collector of one of said transistors to the base of the said other transistor.

2. An electric power supply according to claim 1 wherein said latch comprises:
    a sensing resistor,
    a pair of opposite conductivity transistors, each having a base, emitter, and collector, and
    biasing means coupled to said pair or transistors, including a first and second resistor means, the first resistor means coupled to one end of said sensing resistor and the second resistor means coupled to the other end of said sensing resistor.

3. An electric power supply according to claim 1 wherein said latch circuit comprises:
    a pair of opposite conductivity transistors, each having a base, emitter, and collector, and
    biasing means, coupled to said pair of transistors, including a third resistor means coupled between the base and emitter of one of said transistors.

4. An electric power supply according to claim 1 wherein said latch means comprises:
    a sensing resistor,
    a pair of opposite conductivity transistors, each having a base, emitter, and collector,
    a diode coupled from the collector of one of said transistors to the base of said other transistor, and
    biasing means coupled to said pair of transistors, including a first and second resistor means each coupled to one end of said sensing resistor, and a third resistor means coupled between the base and emitter of one of said transistors.

* * * * *